Patented Feb. 23, 1926.

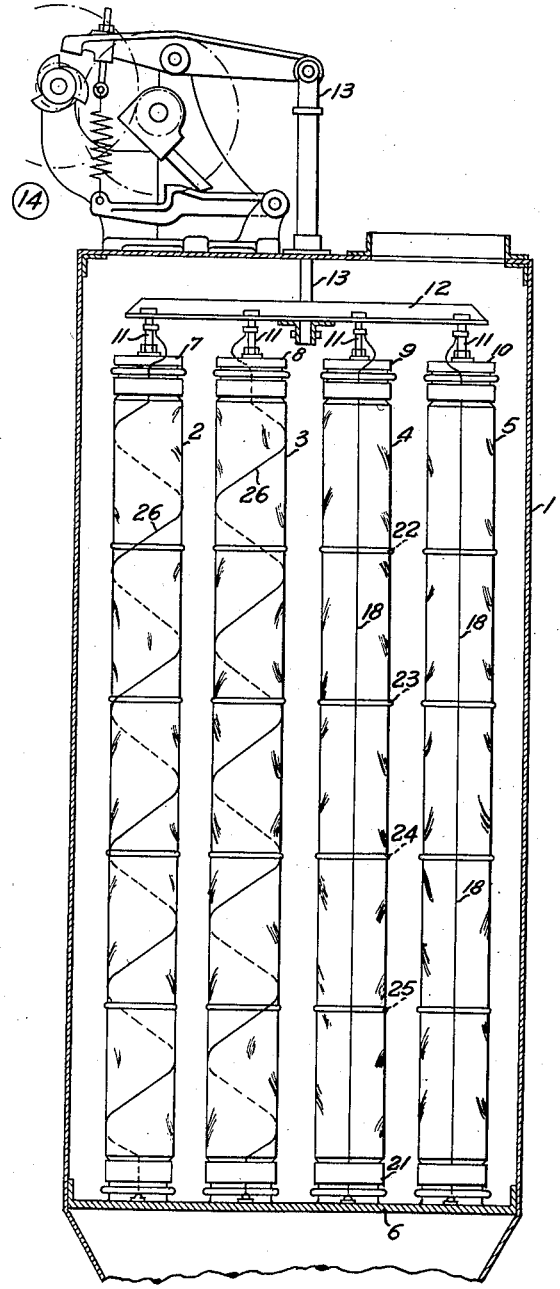
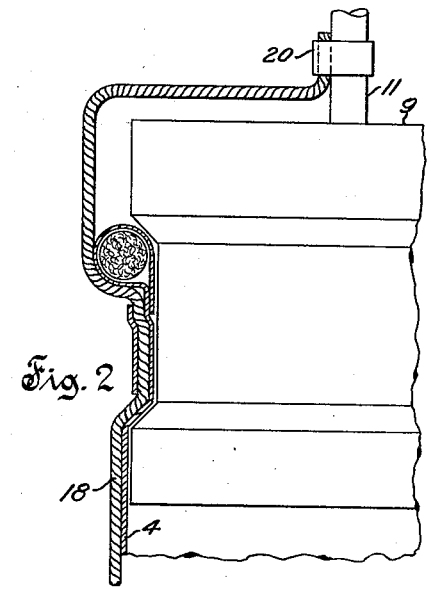
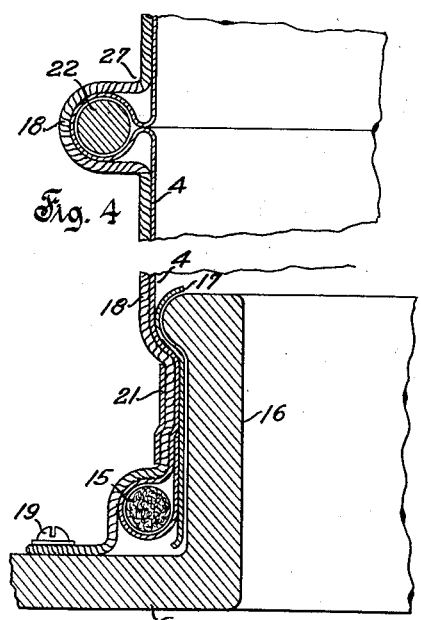

1,574,422

UNITED STATES PATENT OFFICE.

ROBERT F. FEIND, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

DUST COLLECTOR OR FILTER.

Application filed February 20, 1922. Serial No. 537,858.

*To all whom it may concern:*

Be it known that ROBERT F. FEIND, a citizen of the United States, residing at West Allis, in the county of Milwaukee and State of Wisconsin, has invented a certain new and useful Improvement in Dust Collectors or Filters, of which the following is a specification.

This invention relates to the removal of static charges from filter elements, and is particularly applicable to fabric filters such as are used in dust collectors. Dust collecting apparatus usually comprises a filter element through which the dust-laden air is blown or drawn. In such apparatus, fires and explosions sometimes occur particularly when the dust is inflammable. One of the objects of the invention is to prevent the occurrence of such fires and explosions. It has been found that filter elements in dust collectors become charged with static electricity and it is therefore a more specific object to discharge or prevent the accumulation or formation of such charges to the end that electric sparks will not cause fires and explosions. Other objects will appear as the description of the invention proceeds.

The novel features of the invention will more particularly appear from the specification and the accompanying drawing forming a part thereof and showing one embodiment of said invention, and all these novel features are intended to be pointed out in the claims.

In the drawings:

Fig. 1 is an elevation of a dust collecting apparatus in which the invention has been applied, a portion thereof being shown in section.

Fig. 2 is a fragmentary detail view of the upper portion of one of the dust collecting or filter elements a part thereof being in longitudinal section, and Fig. 3 is a similar view of the lower portion of one of said elements.

Fig. 4 is a fragmentary detail view of a longitudinal section of a portion of one of the filter elements.

Referring now more particularly to Fig. 1, the dust collecting apparatus here shown comprises an outer casing 1 in which are disposed the filter elements proper 2, 3, 4, 5, here shown as substantially cylindrical baglike elements of fabric, which, for the sake of brevity, will be hereinafter referred to as bags. The lower ends of the bags are disposed around tubular extensions surrounding openings in a bottom plate 6, as will hereinafter more particularly appear. The upper ends of the bags are disposed around blocks 7, 8, 9, 10, respectively. The blocks are respectively supported by rods 11 in turn supported by a cross rod 12. The cross rod 12 is supported by a connecting rod 13 and through the latter associated with a shaking mechanism 14. This shaking mechanism may be such a one as disclosed in the patent to R. C. Newhouse, No. 1,168,543, Jan. 18, 1916, assigned to Allis-Chalmers Manufacturing Company. This shaking mechanism is so designed that the bags are normally in the slack position, that is, when dust-laden air is being introduced into the inside of the bags. The operation is further such that during an interval in which the flow of air through the bags is reversed, the bags are suddenly stretched and released, thereby cleaning the same.

The bag 4 is shown in detail in Figs. 2, 3 and 4. The lower end of the bag is turned inwardly around a ring of rope 15 and may be suitably stitched in this position. This end of the bag may be disposed about a tubular extension 16 of the bottom plate 6. Between the extension 16 and the bag 4 is an element of shellacked fabric 17. The bag may be suitably fastened to the extension 16 as by a fabric belt 21. The upper end of the bag is shown in Fig. 2 as similarly provided with a rope ring and this end is disposed around block 9 and may be fastened thereto by a fabric belt.

A bare electrical conductor 18 is disposed on the outer surface of the bag 4 and is here shown as running along said surface the full length of the bag. The conductor 18 may be fastened to the bag in any suitable manner. In view of the periodic stretching and re-slackening of the bag, the conductor is preferably of the stranded type so as to render it flexible.

At the lower end of the bag conductor 18 is shown in electrical contact with the bottom plate 6. Any suitable means such as a screw 19 may be used for holding the conductor to the bottom plate. At the upper end, the conductor 18 is in electrical contact with the rod 11 where it may be held as by means of a clamp 20. The conductor 18 is preferably sewed to the bag before the installation of the latter in the dust collecting apparatus, and the fabric belts for holding the bag to the block and tubular extension respectively will pass over the conductor as shown in Figs. 2 and 3. Elsewhere, however, the conductor 18 is entirely bare.

Referring again to Fig. 1, the bag 4 is shown as provided with a plurality of rings 22, 23, 24, 26 for holding the shape of the bag. As will be seen from Fig. 4, showing a section of ring 22, these rings are disposed inside of the bag and are held in position by folding the fabric toward the inner periphery of the ring and suitably stitching the fabric together at the point of contact. The section of Fig. 4 is taken near the wire 18 and therefore shows the manner in which the latter passes over the ring and the fabric of the bag covering the same. It is not essential that the conductor 18 be in contact with the bag to a point as near the ring 22 as indicated in Fig. 4 but it may leave the surface of the bag and jump over the ring with a less abrupt turn than as shown at the point 27.

What has been stated in connection with bag 4 also applies to bag 5.

Bags 2 and 3 are here shown as being provided with bare electrical conductors 26 respectively disposed on the outer surface of the bag in the same manner as conductor 18 with respect to bag 4 except that conductors 26 are wound helically around the respective bags. In certain instances where it may be desirable to secure a better contact the conductor may be wound in this helical fashion. It is however to be undertsood that all of the bags may be provided with straight longitudinal conductors or all of them may be provided with helically wound conductors. Furthermore if desired, each bag may be provided with more than one conductor like conductor 18 for example, disposed at different lines on the circumference of the individual bags.

From the above, it will be apparent that each bag has been grounded by reason of the electrical conductor associated therewith. By the term "grounded" it is to be understood the connection of the electrical conductor to what amounts to a large reservoir for electricity which may be the metal frame of a machine or the earth itself, or both. The essential thing is merely that static electricity accumulating on the bag or tending to accumulate there may be conducted away or discharged so as to prevent an accumulation of electricity at high potential, or to discharge it in such manner that sparks from said discharge will not cause fires or explosions.

It will of course be understood that the invention may be applied in dust filters or collectors of other form than the one herein described by way of example. It is not desired that the invention claimed be limited to the exact details of construction shown and described as obvious modifications will occur to a person skilled in the art.

It is claimed and desired to secure by Letters Patent:

1. A dust collector of the bag type, having a filter bag provided with means for discharging static charges of electricity on said filter comprising a grounded electrical conductor in contact with a substantial portion of said bag.

2. A dust collector of the bag type, having a filter bag provided with means for discharging static charges of electricity on said filter comprising a grounded electrical conductor in contact with said bag substantially throughout the length of said bag.

3. A dust collector of the bag type, having a filter bag provided with means for discharging static charges of electricity on said filter comprising a grounded electrical conductor in contact with the outside of said bag.

4. A dust collector of the bag type, having a filter bag provided with means for discharging static charges of electricity on said filter comprising a grounded bare electrical conductor in contact with a substantial portion of the outside of said bag.

5. A dust collector of the bag type, having a filter bag provided with means for discharging static charges of electricity on said filter comprising a grounded electrical conductor in contact with the outside of said bag substantially throughout the length of said bag.

6. A dust collector of the bag type, having a filter bag provided with means for discharging static charges of electricity on said filter comprising a grounded bare electrical conductor in contact with the outside of said bag substantially throughout the length of said bag.

7. A dust collector of the bag type having a filter bag provided with means for discharging static charges of electricity on said filter comprising a grounded electrical conductor wound helically around said bag.

8. A dust collector of the bag type having a filter bag provided with means for discharging static charges of electricity on said filter comprising a grounded bare electrical conductor wound helically around said bag.

9. As an article of manufacture, a fabric filter adapted to be used in a dust collector, said filter having a bare electrical conductor permanently fastened thereto and associated with a substantial portion of an outer surface of said filter so that static electricity may be removed therefrom.

10. A three dimensional dust collector provided with filter means having a portion salient to and constituting an outer surface with respect to the surrounding atmosphere, and means for discharging charges of static electricity on said surface including at least one grounded electrical conductor in contact with a substantial portion of said surface.

In testimony whereof, the signature of the inventor is affixed hereto.

ROBERT F. FEIND.